(12) United States Patent
Kondo et al.

(10) Patent No.: US 9,413,458 B2
(45) Date of Patent: Aug. 9, 2016

(54) ILLUMINATION LIGHT COMMUNICATION APPARATUS AND ILLUMINATION LIGHT COMMUNICATION SYSTEM USING THE SAME

(71) Applicant: PANASONIC INTELLECTUAL PROPERTY MANAGEMENT CO., LTD., Osaka (JP)

(72) Inventors: Yosuke Kondo, Osaka (JP); Masaaki Ikehara, Osaka (JP); Shojirou Kido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/619,302

(22) Filed: Feb. 11, 2015

(65) Prior Publication Data
US 2015/0263808 A1   Sep. 17, 2015

(30) Foreign Application Priority Data
Mar. 13, 2014   (JP) .................................. 2014-049785

(51) Int. Cl.
*H04B 10/00* (2013.01)
*H04B 10/116* (2013.01)

(52) U.S. Cl.
CPC .................................... *H04B 10/116* (2013.01)

(58) Field of Classification Search
CPC ............... H04B 10/116; H04B 10/112; H04B 10/1121; H04B 10/1123; H04B 10/1127; H04B 10/1129; H04B 10/114; H04B 10/1141; H04B 10/1143; H04B 10/1149; H05B 33/0845; H05B 33/0821

USPC ......... 398/172, 128, 127, 130, 118, 119, 115, 398/182, 183, 135, 136, 186; 315/291, 294, 315/297, 307, 308

See application file for complete search history.

(56) References Cited

U.S. PATENT DOCUMENTS

| 7,548,698 B2* | 6/2009 | Yamamoto | ......... H04B 10/1149 398/127 |
| 8,280,398 B2* | 10/2012 | Ishii | ......................... G01S 1/70 340/539.13 |
| 2012/0230698 A1* | 9/2012 | Park | .................. H04B 10/1149 398/118 |

FOREIGN PATENT DOCUMENTS

| JP | 2010-165522 | 7/2010 |
| JP | 2014-001987 | 1/2014 |
| JP | 2014-027415 | 2/2014 |

*Primary Examiner* — Hanh Phan
(74) *Attorney, Agent, or Firm* — Greenblum & Bernstein, P.L.C.

(57) ABSTRACT

An illumination light communication apparatus includes: a light source; a power supply circuit; a switching element which modulates an output current supplied from the power supply circuit to the light source; a visible light communication signal circuit which controls ON and OFF of the switching element to output a modulating signal for superimposing a visible light beacon signal including a unique ID onto the illumination light emitted from the light source; a control power supply circuit which supplies power to the visible light communication signal circuit; a wireless module which transmits a radio wave beacon signal including a unique ID; and a radio wave beacon controlling and transmitting circuit which controls the radio wave beacon signal transmitted from the wireless module, wherein the radio wave beacon controlling and transmitting circuit is supplied with power from the control power supply circuit.

10 Claims, 12 Drawing Sheets

ILLUMINATION LIGHT COMMUNICATION APPARATUS AND ILLUMINATION LIGHT COMMUNICATION SYSTEM USING THE SAME

CROSS REFERENCE TO RELATED APPLICATIONS

The present application is based on and claims priority of Japanese Patent Application No. 2014-049785 filed on Mar. 13, 2014. The entire disclosure of the above-identified application, including the specification, drawings and claims is incorporated herein by reference in its entirety.

BACKGROUND OF THE INVENTION

1. Field of the Invention

The present disclosure relates to an illumination light communication apparatus which superimposes a communication signal onto illumination light by modulating a light intensity of the illumination light, and an illumination light communication system using the illumination light communication apparatus.

2. Description of the Related Art

Lighting apparatuses provided with visible light communication functions for transmitting communication signals using illumination light have conventionally been known. As one type of the above-described lighting apparatuses, a lighting system is known which includes: a lighting apparatus that transmits own address data to a predetermined region via a visible light communication scheme; and a terminal which receives the address data (see, for example, Patent Literature (PTL) 1). A visible light communication system is known which includes a lighting apparatus that transmits and receives location information or the like to and from a mobile terminal including a visible light communication module via a visible light communication (see, for example, PTL 2).

In addition, a location detecting system is known which transmits and receives own location information via several communication tools including not only the visible light communication but also IMES (Indoor Messaging System) communication, for example (see, for example, PTL 3). The visible light communication using a lighting apparatus is suitable for identifying location information because the communication can be established only in a range irradiated with illumination light. However, the illumination light does not always stay on. For that reason, as in the above-described PTL 3, it is possible to surely acquire accurate location information of a communication terminal by combining a plurality of communication tools.

CITATION LIST

Patent Literature

[PTL 1] Japanese Unexamined Patent Application Publication No. 2010-165522

[PTL 2] Japanese Unexamined Patent Application Publication No. 2014-27415

[PTL 3] Japanese Unexamined Patent Application Publication No. 2014-1987

SUMMARY OF THE INVENTION

However, when using a plurality of communication tools such as the visible light communication and a wireless communication via a radio wave, it is necessary to derive a control power supply circuit for each of the communication tools from commercial power, leading to an increase in the size of the power supply circuit and costs. In particular, the visible light communication using a lighting apparatus has a narrow range in which communication can be established using illumination light, and thus more than one lighting apparatus is required to be introduced into a location information system which identifies a location of a communication terminal. The increase in the size of an individual lighting apparatus and the increase in costs are obstacles to system introduction.

The present disclosure presents a solution to the above-described problem, and has an object to provide an illumination light communication apparatus and an illumination light communication system using the illumination light communication apparatus, each of which allows introducing the visible light communication and the wireless communication using a radio wave without involving an increase in the size of an apparatus or an increase in costs.

An illumination light communication apparatus according to an aspect of the present disclosure is an illumination light communication apparatus which superimposes a communication signal onto illumination light by modulating a light intensity of the illumination light, the illumination light communication apparatus including: a light source including a solid-state light-emitting element; a power supply circuit which adjusts illumination light of the light source by controlling a load current flowing into the light source; a switching element which modulates an output current supplied from the power supply circuit to the light source; a visible light communication signal circuit which controls ON and OFF of the switching element to output a modulating signal for superimposing a visible light beacon signal including a unique ID onto the illumination light emitted from the light source; a control power supply circuit which supplies power to the visible light communication signal circuit; a wireless module which transmits a radio wave beacon signal including a unique ID; and a radio wave beacon controlling and transmitting circuit which controls the radio wave beacon signal transmitted from the wireless module, wherein the radio wave beacon controlling and transmitting circuit is supplied with power from the control power supply circuit.

According to the present disclosure, a visible light communication signal circuit and a radio wave beacon controlling and transmitting circuit share the same control power supply, thereby allowing reducing the size of a lighting apparatus and reducing costs, making it possible to suppress the introduction costs for the visible light communication system using a plurality of lighting apparatuses.

BRIEF DESCRIPTION OF DRAWINGS

The figures depict one or more implementations in accordance with the present teaching, by way of examples only, not by way of limitations. In the figures, like reference numerals refer to the same or similar elements

DETAILED DESCRIPTION OF THE PREFERRED EMBODIMENTS

The following describes an illumination light communication apparatus according to a first exemplary embodiment of the present disclosure, with reference to FIG. 1 to FIG. 5. Here, as illustrated in FIG. 1A to FIG. 1C, a downlight embedded in a ceiling or the like is shown as an example of the configuration of the illumination light communication apparatus (hereinafter referred to as lighting apparatus 1) of the exemplary embodiment. The example here shows a downlight as lighting apparatus 1. However, lighting apparatus 1 is only required to be capable of emitting illumination light to a certain range in an institution or the like, and may be, for example, a base light, a bracket, a lighting equipment for a wiring duct, a light-bulb LED (light-emitting diode) lighting equipment, or the like. In addition, lighting apparatus 1 may be a lighting equipment for a signboard which is suspended from a ceiling or installed in a wall.

Lighting apparatus 1 includes: light source 11 having a circuit board on which a plurality of solid-state light-emitting elements (LEDs 2) are mounted; and main body 12 which houses lighting circuit 10 (see FIG. 2 and FIG. 3 which are described later) that turns on LEDs 2 of light source 11. In addition, lighting apparatus 1 includes: frame 13 which is fitted into an opening defined in a ceiling or the like and holds light source 11 and the like; terminal block 14 to which a power wire for receiving supply of power from a commercial AC power supply; reflective member 15 which controls light distribution; and attachment spring 16 for securing frame 13 to the ceiling or the like.

Figure 1A:
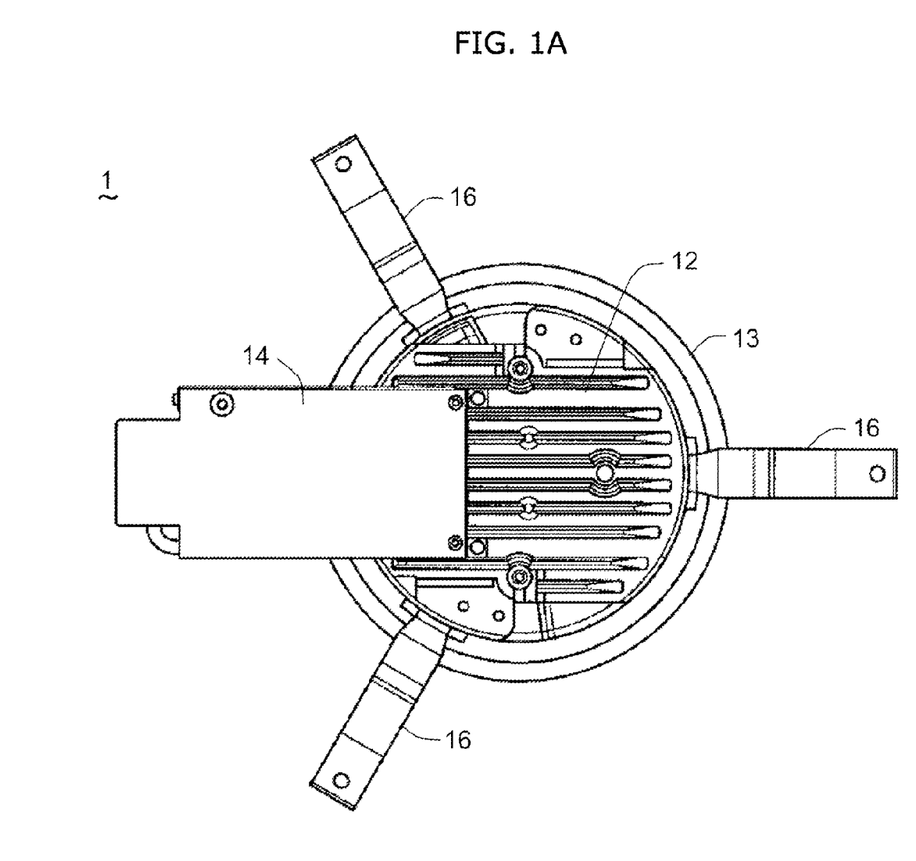
FIG. 1A is a top view illustrating an external view of a lighting apparatus according to a first exemplary embodiment of the present disclosure.
Figure 1B:
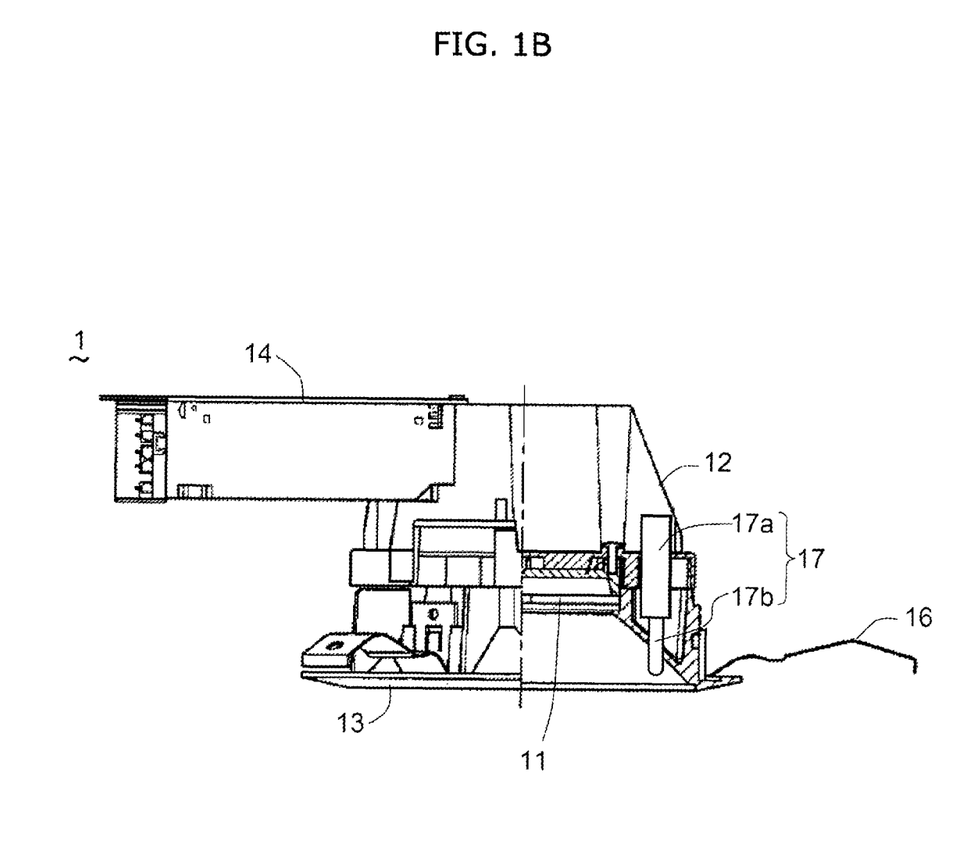
FIG. 1B is a side view of the lighting apparatus according to the first exemplary embodiment of the present disclosure.
Figure 1C:
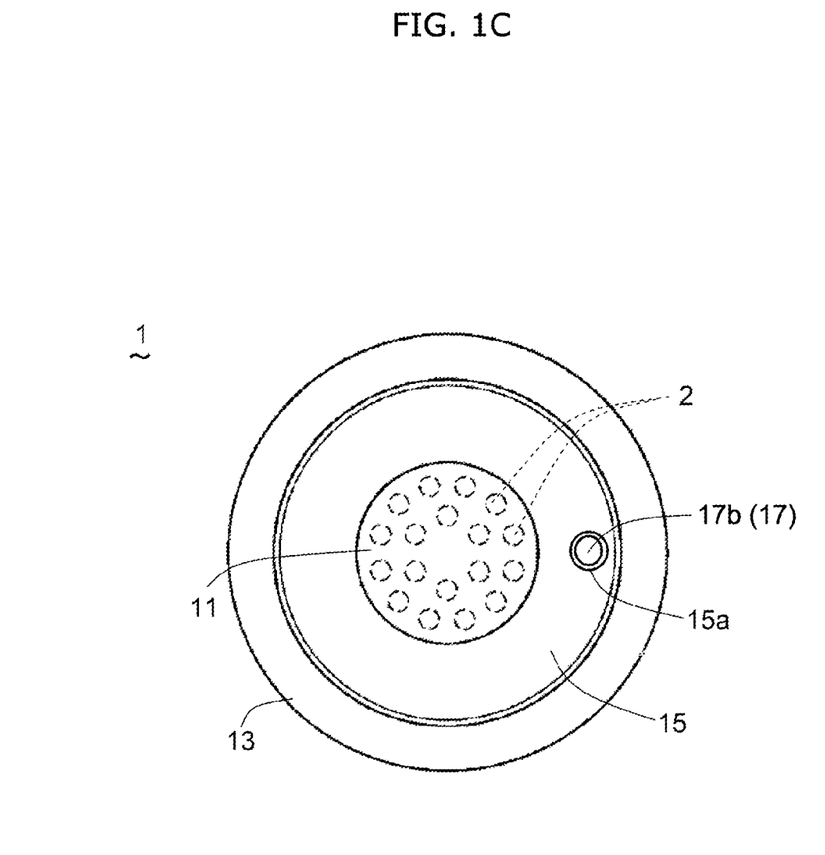
FIG. 1C is a bottom view of the lighting apparatus according to the first exemplary embodiment of the present disclosure.

In addition, lighting apparatus 1 includes wireless module 17 which transmits a radio wave beacon signal including a unique ID. Wireless module 17 includes: radio wave beacon controlling and transmitting circuit 17a which controls the radio wave beacon signal including the location information of lighting apparatus 1 as the unique ID; and antenna 17b which outputs a radio wave signal. Reflective member 15 has hole 15a through which antenna 17b is exposed to outside lighting apparatus 1. It is to be noted that, also in the case where lighting apparatus 1 is applied to equipment other than the illustrated downlight, when the equipment is covered by a metal body, a configuration which facilitates outputting of a radio wave signal is suitably employed by disposing at least antenna 17b of wireless module 17 outside the equipment, or defining a hole in the metal body in the same manner as the above-described exemplary embodiment. It is to be noted that antenna 17b of wireless module 17 also functions as a receiver which receives a radio wave module signal transmitted from an external terminal.

Figure 2:
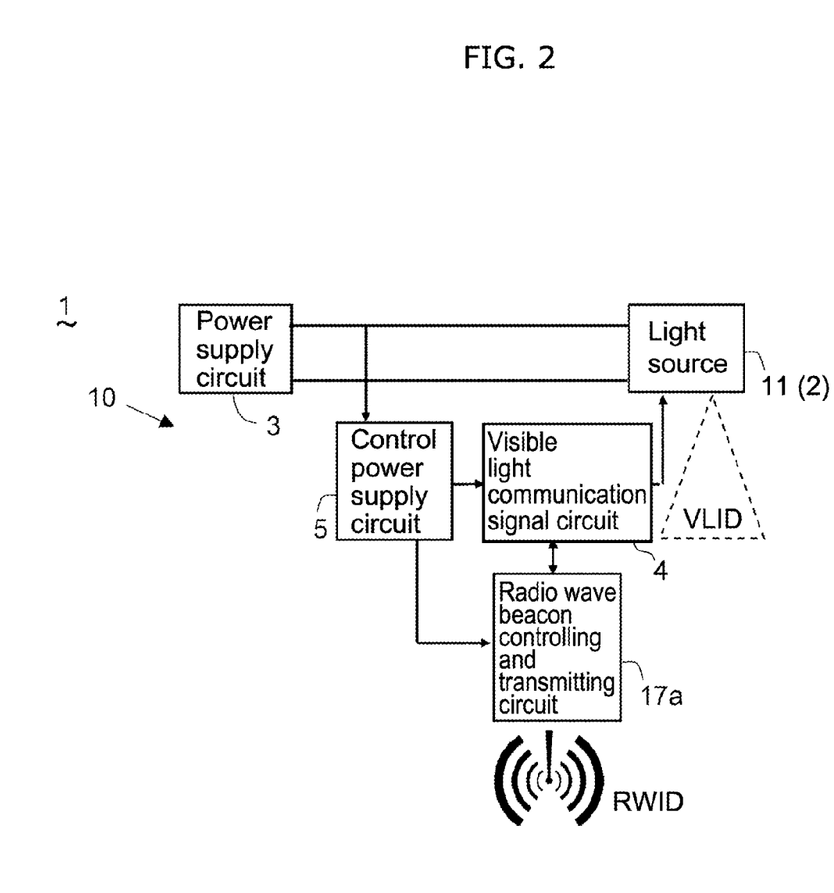
FIG. 2 is a block diagram illustrating an outline of a circuit configuration of the above-described lighting apparatus.

The lighting circuit of lighting apparatus 1 is a circuit which adjusts illumination light of light source 11 by controlling a load current passing through light source 11 including LEDs 2 based on a predetermined light adjusting signal. As illustrated in FIG. 2, lighting circuit 10 includes: power supply circuit 3 which controls a load current flowing into light source 11 based on a light adjusting signal; visible light communication signal circuit 4 which outputs a modulating signal for superimposing a communication signal onto illumination light of light source 11; and control power supply circuit 5 which supplies power to visible light communication signal circuit 4. In addition, radio wave beacon controlling and transmitting circuit 17a is supplied with power by control power supply circuit 5 in lighting circuit 10.

Figure 3:
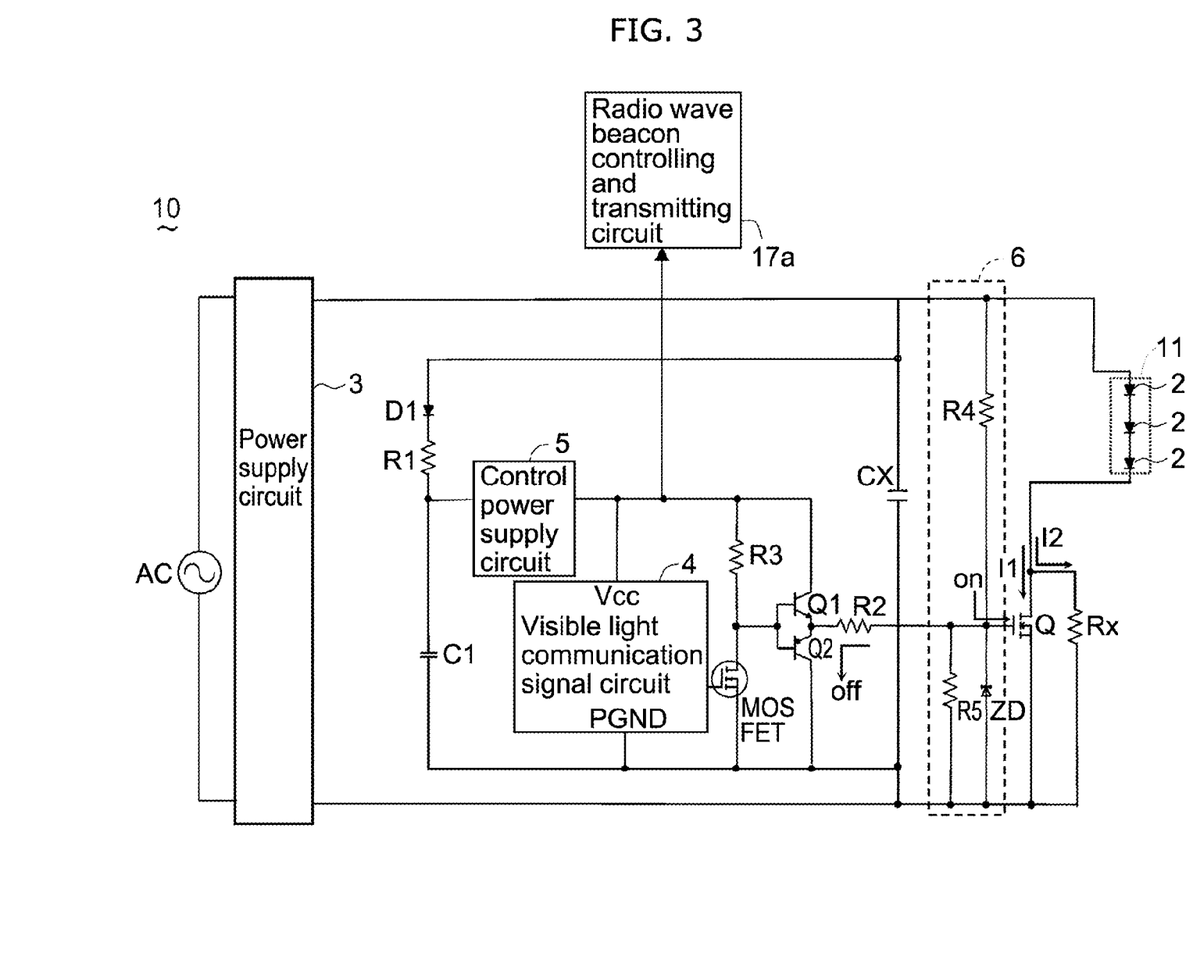
FIG. 3 is a detailed circuit diagram of the above-described lighting apparatus.

As illustrated in FIG. 3, power supply circuit 3 includes: an AC/DC converter which receives a commercial power supply AC as an input; and an output controller (not illustrated) which controls a load current flowing into light source 11. Control power supply circuit 5 is connected to power supply circuit 3 between both outputs of power supply circuit 3 via rectifying diode D1 and resistor R1, and capacitor CX for smoothing is connected in parallel. In addition, capacitor C1 is connected between an input terminal of control power supply circuit 5 and a PGND (power ground) of visible light communication signal circuit 4.

In addition, lighting circuit 10 includes: an impedance element (modulation resistor Rx) connected to light source 11 in series; and a switching element (modulation switching element Q) which modulates an output current supplied from power supply circuit 3 to light source 11. For modulation switching element Q, nMOSFET (n-type metal-oxide semiconductor field-effect transistor) is used, for example. Modulation resistor Rx is connected to modulation switching element Q in parallel. In addition, one end of modulation resistor Rx is connected to one of the input terminals of control power supply circuit 5 for supplying a gate voltage to modulation switching element Q.

Lighting circuit 10 includes forced-on circuit 6 which turns on modulation switching element Q using power supplied from power supply circuit 3 when visible light communication signal circuit 4 is not driven. Forced-on circuit 6 is connected between visible light communication signal circuit 4 and the gate of modulation switching element Q via transistors Q1 and Q2 and resistor R2 which serve as inverters. In addition, resistor R3 which adjusts a load voltage from control power supply circuit 5 is connected in the path. Furthermore, nMOSFET is connected to the output terminal of visible light communication signal circuitry 4. Forced-on circuit 6 includes: resistor R4 connected in parallel with light source 11; and zener diode ZD and resistor R5 which are connected for voltage stabilization and voltage adjustment. A value of resistor R4 is selected as appropriate to cause a voltage which turns on modulation switching element Q and is of a degree that is neutralized by an off voltage provided from visible light communication signal circuit 4 is provided to forced-on circuit 6.

For LED 2 of light source 11, an LED that is capable of emitting illumination light of a desired color in lighting apparatus 1 is used, for example, a white LED which includes a GaN blue LED chip coated with YAG yellow phosphor and emits white light by mixing blue light and yellow light. It is to be noted that, not only the white LED but also a plurality of LEDs having different luminescent colors of red, green, and blue may be appropriately combined and used, or an OLED (organic light emitting diode) using an organic emissive material for the light source may be used.

The output controller of power supply circuit 3 includes a general-purpose microcomputer or the like, and for example, switches ON and OFF of the switching element in the AC/DC converter based on a light adjusting signal transmitted from an external device (not illustrated) for inputting a light adjustment operation, such as a remote controller, thereby performing PWM control on light source 11 to adjust light.

Visible light communication signal circuit 4 includes a general-purpose microcomputer or the like, generates a predetermined modulating signal to be superimposed on illumination light by modulating a light intensity of light source 1, and outputs the generated modulating signal to modulation switching element Q. A frequency of the modulating signal is set higher than at least a frequency of the adjusting signal so that a plurality of waveforms are included in one cycle of the adjusting signal. Control power supply circuit 5 includes a DC/DC converter, and converts a DC voltage transmitted from power supply circuit 3 into a DC voltage having a predetermined voltage value which is suitable to visible light communication signal circuit 4.

In this configuration, visible light communication signal circuit 4 receives power supply from control power supply circuit 5, controls ON and OFF of modulation switching element Q based on a predetermined communication signal, and thereby switches between connecting and not connecting modulation resistor Rx to light source 11. More specifically, when modulation switching element Q is ON, load current flows into light source 11 without involving modulation resistor Rx. On the other hand, when modulation switching element Q is OFF, load current 12 flows into light source 11 via modulation resistor Rx. For that reason, a current value of load current I1 when modulation switching element Q is ON is larger than a current value of load current 12 when modulation switching element Q is OFF. As described above, the light intensity of light source 11 is modulated by changing a magnitude of the load current flowing into light source 11, thereby enabling superimposing a communication signal on the illumination light of light source 11.

In addition, since modulation resistor Rx connected in parallel with modulation switching element Q is present, a load voltage supplied from power supply circuit 3 to light source 11 is not interrupted when modulation switching element Q is OFF. This prevents light source 11 from being in an unloaded condition on lighting circuit 10, and thus a power supply voltage of power supply circuit 3 does not increase. In addition, since an input terminal of control power supply circuit 5 is connected to one end of modulation resistor Rx, a voltage of the input terminal of control power supply circuit 5 is suppressed to a voltage that is determined by (i) a current flowing into light source 11 and (ii) modulation resistor Rx. It is therefore possible to stabilize the power supply voltage of power supply circuit 3 and an input voltage to control power supply circuit 5, and also to reduce a loss of circuit. In addition, it is possible to use, for power supply circuit 3 or control power supply circuit 5, not an expensive component having high pressure resistance or a large number of components but an inexpensive general-purpose circuit component, and furthermore, since the circuit design is simple, it is possible to implement downsizing of lighting circuit 10 and lighting apparatus 1 using lighting circuit 10, and reducing the costs.

In addition, even in the state where the microcomputer of visible light communication signal circuit 4 is not running and modulation switching element Q1 is not supplied with power from control power supply circuit 5, forced-on circuit 6 causes ON signals to continuously flow into the gate of modulation switching element Q1 from power supply circuit 3. More specifically, even in the state where the microcomputer of visible light communication signal circuit 4 is not running, the modulation switching element Q remains ON and a current of light source 11 flows without involving modulation resistor Rx. For that reason, even when the microcomputer of visible light communication signal circuit 4 starts up and output of ON signals from control power supply 5 via transistors Q1 is started, there is no change in the impedance between output terminals of power supply circuit 3 and no surge current occurring in the output current flowing into light source 11. When the microcomputer of visible light communication signal circuit 4 starts up and an OFF signal is outputted, a return current (off in FIG. 3) arises flowing in the direction of transistor Q2 from forced-on circuit 6, which neutralizes the ON signal in the gate of modulation switching element Q, by forced-on circuit 6. As a result, modulation switching element Q is turned OFF, and load current 12 flows into modulation resistor Rx. Thus, according to the above-described configuration, it is possible to stabilize the power supply voltage of power supply circuit 3 and suppress occurrence of a surge current when modulation switching element Q starts an ON operation, making it possible to reduce a current stress on light source 11.

As described above, radio wave beacon controlling and transmitting circuit 17a is supplied with power from control power supply circuit 5. More specifically, visible light communication signal circuit 4 and radio wave beacon controlling and transmitting circuit 17a share the same control power supply, thereby allowing reducing the size of lighting apparatus 1 and costs, making it possible to suppress introduction costs for the visible light communication system using a plurality of lighting apparatuses 1. In addition, by controlling visible light communication signal circuit 4 and radio wave beacon controlling and transmitting circuit 17a at the same potential, it is possible to easily synchronize and activate visible light communication signal circuit 4 and radio wave beacon controlling and transmitting circuit 17a.

Figure 4:
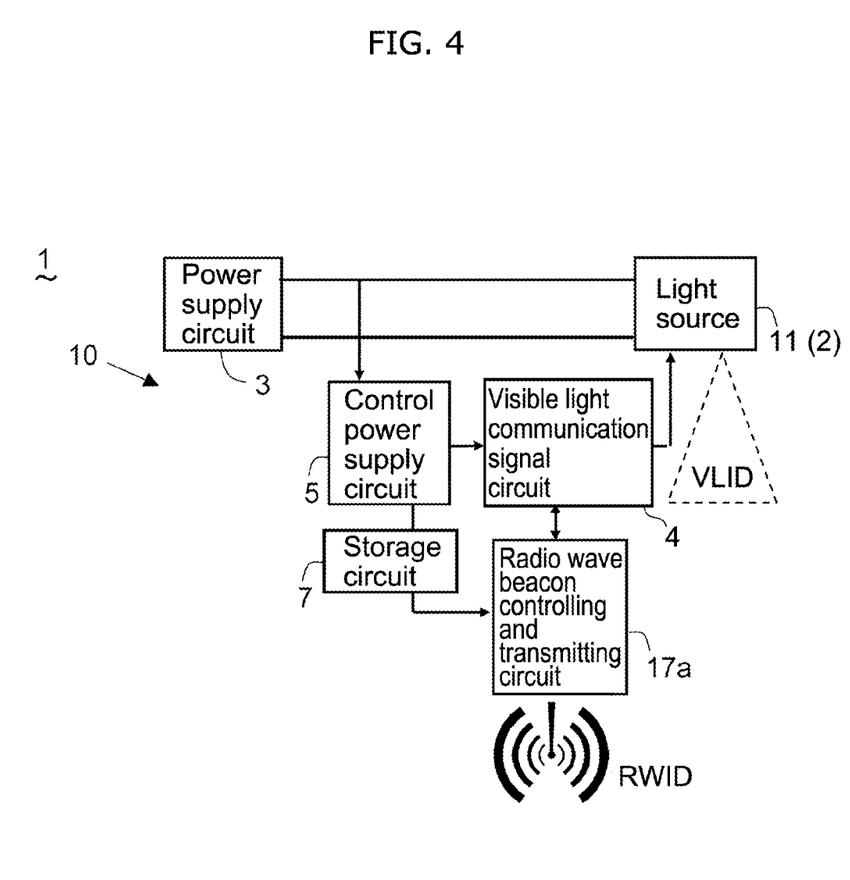
FIG. 4 is a block diagram illustrating a circuit configuration according to a modification example of the above-described lighting apparatus.
Figure 5A:
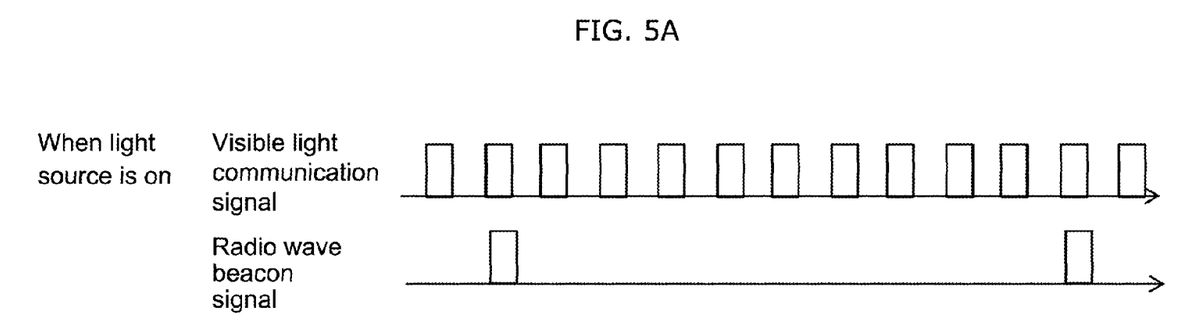
FIG. 5A is a diagram illustrating an example of outputting beacon signals when a light source of the above-described lighting apparatus is lighting.
Figure 5B:
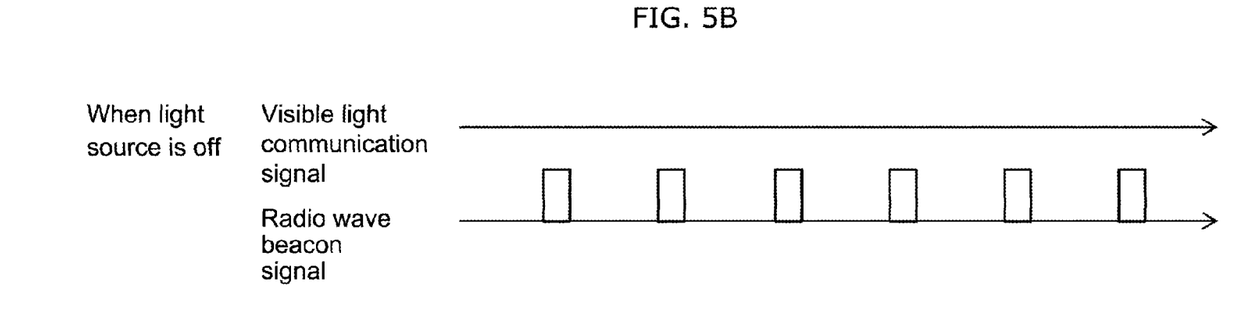
FIG. 5B is a diagram illustrating an example of outputting beacon signals when the light source of the above-described lighting apparatus is off.

Next, a lighting apparatus according to a modification example of the above-described exemplary embodiment will be described with reference to FIG. 4 and FIG. 5. As illustrated in FIG. 4, lighting circuit 10 of lighting apparatus 1 according to the modification example further includes storage circuit 7 connected between visible light communication signal circuit 4 and radio wave beacon controlling and transmitting circuit 17a. Then, when light source 11 is off, radio wave beacon controlling and transmitting circuit 17a (wireless module 17) is supplied with a driving power from storage circuit 7 and transmits a radio wave beacon signal.

According to the modification example, although a visible light beacon signal is transmitted only when light source 11 is lighting, radio wave beacon controlling and transmitting circuit 17a which shares the same control power supply with visible light communication signal circuit 4 is capable of transmitting a radio wave beacon signal even when visible light communication signal circuit 4 is not driven.

In addition, according to the above-described modification example, radio wave beacon controlling and transmitting circuit 17a (wireless module 17) shortens the interval for transmitting the radio wave beacon signal when light source 11 is off, compared to the time when light source 11 is lighting. As illustrated in FIG. 5A, when light source 11 is lighting, both of the visible light beacon signal and the radio wave beacon signal are transmitted. On the other hand, as illustrated in FIG. 5B, only the radio wave beacon signal is transmitted when light source 11 is off. In view of the above, it is possible to facilitate receiving of a communication signal by a communication terminal outside lighting apparatus 1, by shortening the interval for outputting the radio wave beacon signal and increasing the number of times the radio wave beacon signal is outputted per hour.

Figure 6:
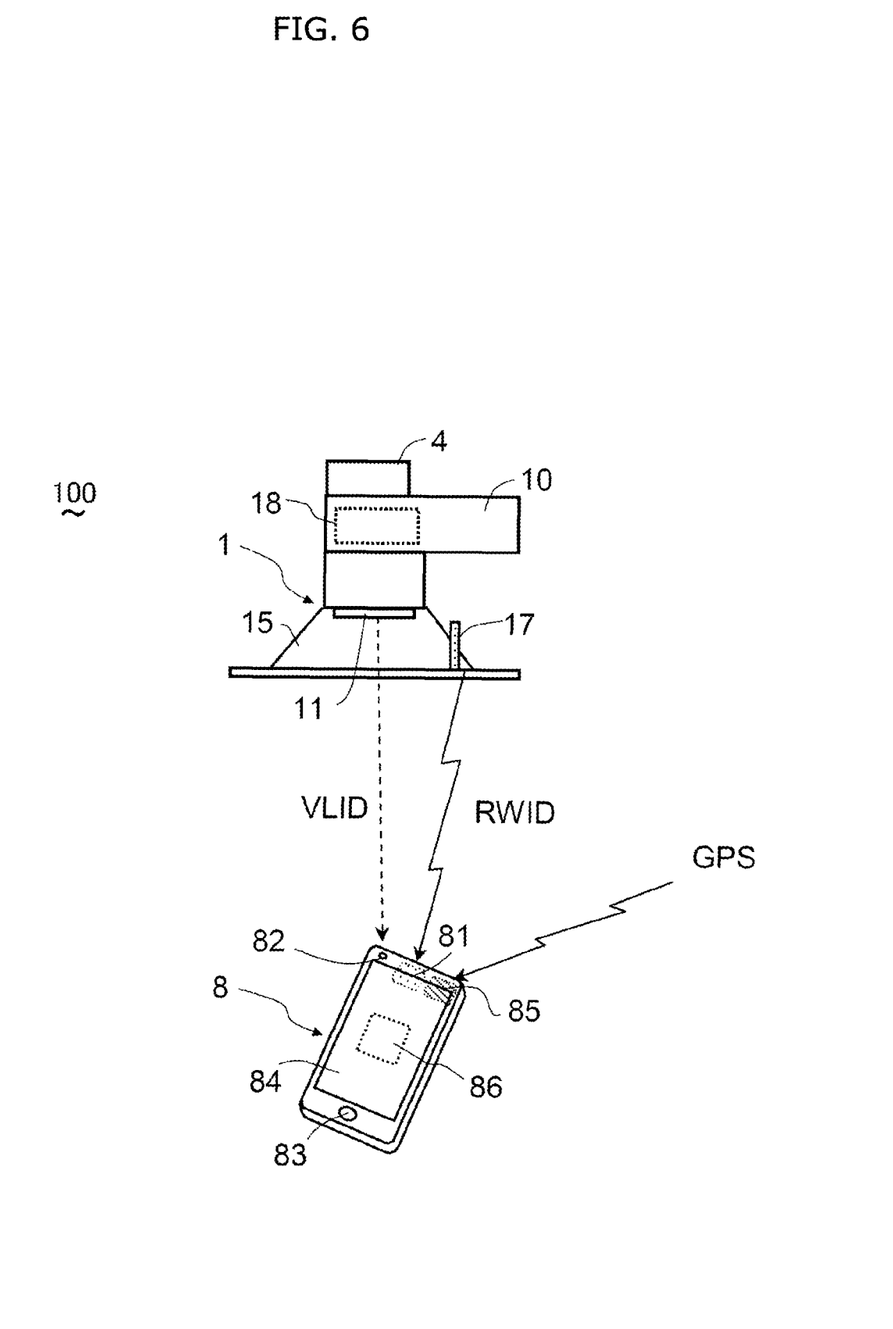
FIG. 6 is a diagram illustrating a configuration of a visible light communication system using the lighting apparatus according to the above-described exemplary embodiment.

Next, a visible light communication system using the lighting apparatus according to the above-described exemplary embodiment will be described with reference to FIG. 6 to FIG. 8. As illustrated in FIG. 6, visible light communication system 100 includes: lighting apparatus 1 which modulates a light intensity of illumination light and performs a visible light communication; and terminal 8 which performs visible light communication with lighting apparatus 1. It is to be noted that a server (not illustrated) connected to terminal 8 via a network is further included. Terminal 8 is, for example, a smartphone illustrated, a tablet terminal, or other dedicated devices. It is to be noted that terminal 8 is not limited to the above-described mobile terminals, and may be implemented by integrating the above-described communication tools additionally into a flashlight or a carriage, for example. In addition, the example here shows a downlight as lighting apparatus 1. However, as with the above-described exemplary embodiment, lighting apparatus 1 is only required to be capable of emitting illumination light to a certain range in an institution or the like, and may be, for example, a base light, a bracket, or the like.

Lighting apparatus 1 includes: light source 11; lighting circuit 10 which controls lighting of light source 11; and reflective member 15 which controls light distribution of light emitted from light source 11. In addition, lighting apparatus 1 includes a beacon transmitting device which transmits a unique ID including location information. The beacon transmitting device includes: wireless module 17 which transmits a unique ID (RW(radio wave) ID) using a radio wave as a communication medium; and a visible light beacon transmitting device which transmits a unique ID (VL (visible light) ID) using visible light as a communication medium. The range of a radio wave signal of wireless module 17 is larger than the range of illumination light of lighting apparatus 1 (visible light beacon transmitting device). In the diagram, a radio wave signal is represented as solid arrows, and a visible light signal is represented as a dashed line.

Wireless module 17 is a transmitter which uses a specified low-power radio waves such as Wi-Fi, Bluetooth (registered trademark), and Bluetooth (registered trademark)-LE. The visible light beacon transmitting device mainly include: light source 11; lighting circuit 10; ID storage 18 in which VLID indicating the location information of lighting apparatus 1 is stored; and visible light communication signal circuit 4 which controls the operation of lighting circuit 10 and superimposes VLID onto the illumination light from lighting apparatus 1. VLID is a unique number different for each of lighting apparatuses 1, and includes, for example, a MAC address, or ubiquitous ID determined by a ubiquitous ID center. ID storage 18 is a writable memory such as a flash memory.

Terminal 8 includes: radio wave receiver 81 which receives a radio wave signal (RWID) from wireless module 17; and light receiver 82 which receives illumination light (VLID) from lighting apparatus 1. Radio wave receiver 81 includes a receiver which receives a specified low-power radio waves such as Wi-Fi, Bluetooth (registered trademark), and Bluetooth (registered trademark)-LE. It is to be noted that, although FIG. 6 shows an example in which VRID transmitted from wireless module 17 is received by radio wave receiver 81, bidirectional communications are allowed between wireless module 17 and radio wave receiver 81. Light receiver 82 includes: a light receiving element (not illustrated) such as a photodiode and a PIN diode; and an optical filter (not illustrated) which allows only a signal light including VLID of the light received by the light receiving element to pass through.

In addition, terminal 8 includes: inputter 83 which receives an input from a user; display 84 which displays data received from a server (not illustrated); and GPS (global positioning system) receiver 85 for acquiring location information from a GPS satellite. Inputter 83 receives, for example, an input of at least one of: a group ID for identifying a group to which certain terminal 8 belongs; a user ID for identifying a user who holds certain terminal 8; and a password for authenticating the user. It is possible, by including a login mechanism described above, to transmit and receive data only with specific terminal 8 even when unspecified number of terminals 8 are present around. Display 84 includes a touch panel display or the like which displays data received from the server. It is to be noted that GPS receiver 85 also functions as a radio wave transmitter, is capable of transmitting a radio wave signal having a frequency different from a frequency of the radio wave signal transmitted from wireless module 17, and connects terminal 8 to the server via a wireless network.

In addition, terminal 8 includes a light emitter (not illustrated) which emits light on which a unique ID is superimposed, and controller 86 which controls an operation of each of the elements of terminal 8. The light emitter superimposes a communication signal onto visible light emitted from a light source for a flash function mounted on terminal 8 in the same manner as above-described lighting apparatus 1.

Each of RWID and VLID includes location information as a unique ID, and terminal 8 is capable of recognizing a location at which terminal 8 is present, based on the location information acquired from each of RWID and VLID. For example, when a person who holds terminal 8 approaches an area where lighting apparatus 1 is placed, since the range of a radio wave signal is larger than the range of illumination light of lighting apparatus 1, RWID is first acquired via a communication between radio wave receiver 81 and wireless module 17. Then, when light receiver 82 of terminal 8 receives VLID from illumination light of lighting apparatus 1, it is possible to recognize a location at which terminal 8 is present, based on the location information acquired from each of RWID and VLID.

It is to be noted that, even when light receiver 32 of terminal 8 does not receive VLID, it is possible to identify approximate location information of terminal 8 when unique RWID is received from wireless module 17. In other words, it is possible to accurately identify location information when visible light can be received, and it is possible to complementarily identify location information using a radio wave even when visible light cannot be received.

Display 84 functions as an information outputter which outputs guidance information to a user, and displays the identified location information. This allows a user of terminal 8 to confirm the location where the user is present. In addition, when the illuminance of visible light received by light receiver 82 is greater than or equal to a predetermined threshold, display 84 (information outputter) is activated. This prevents display 84 to be driven more than necessary, and thus it is possible to suppress power consumption. In addition, when the radio wave intensity of the radio wave beacon signal received by radio wave receiver 81 is smaller than a predetermined threshold, display 84 may be activated in the same manner as above.

In addition, terminal 8 executes a low power consumption mode in which light receiver 82 is OFF when the radio wave intensity of the radio wave beacon signal received by radio wave receiver 81 is smaller than a predetermined threshold, and executes a receiving preparation mode in which light receiver 82 is driven when the radio wave intensity is greater than or equal to the threshold. More specifically, terminal 8 interrupts power supply to light receiver 82 and thereby causes light receiver 82 to be OFF, when radio wave receiver 81 does not receive a radio wave signal at an intensity greater than or equal to the predetermined threshold. With this, it is possible to reduce the time period during which light receiver 32 is ON, and to suppress power consumption.

Figure 7:
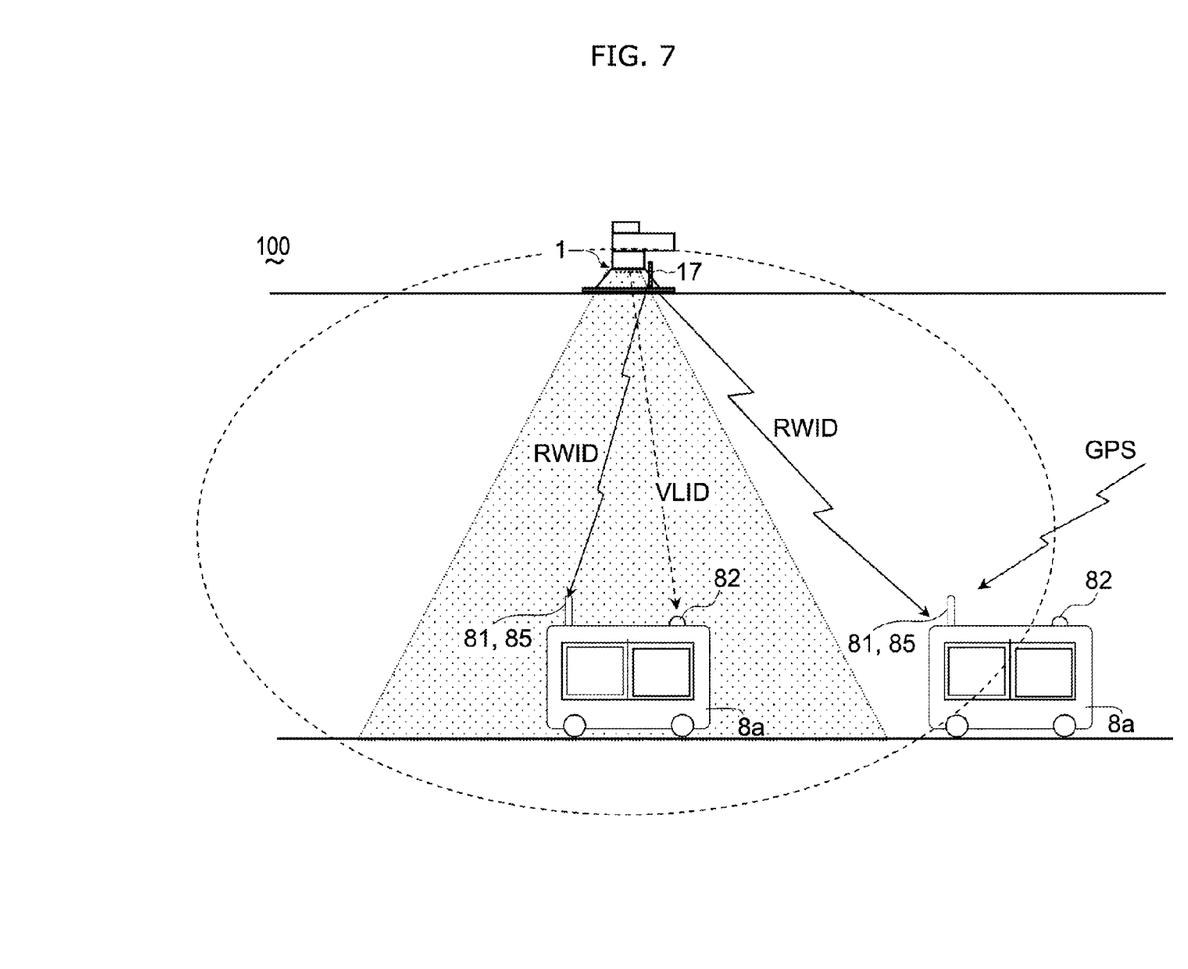
FIG. 7 is a diagram illustrating an example of an application of the above-described visible light communication system.
Figure 8:
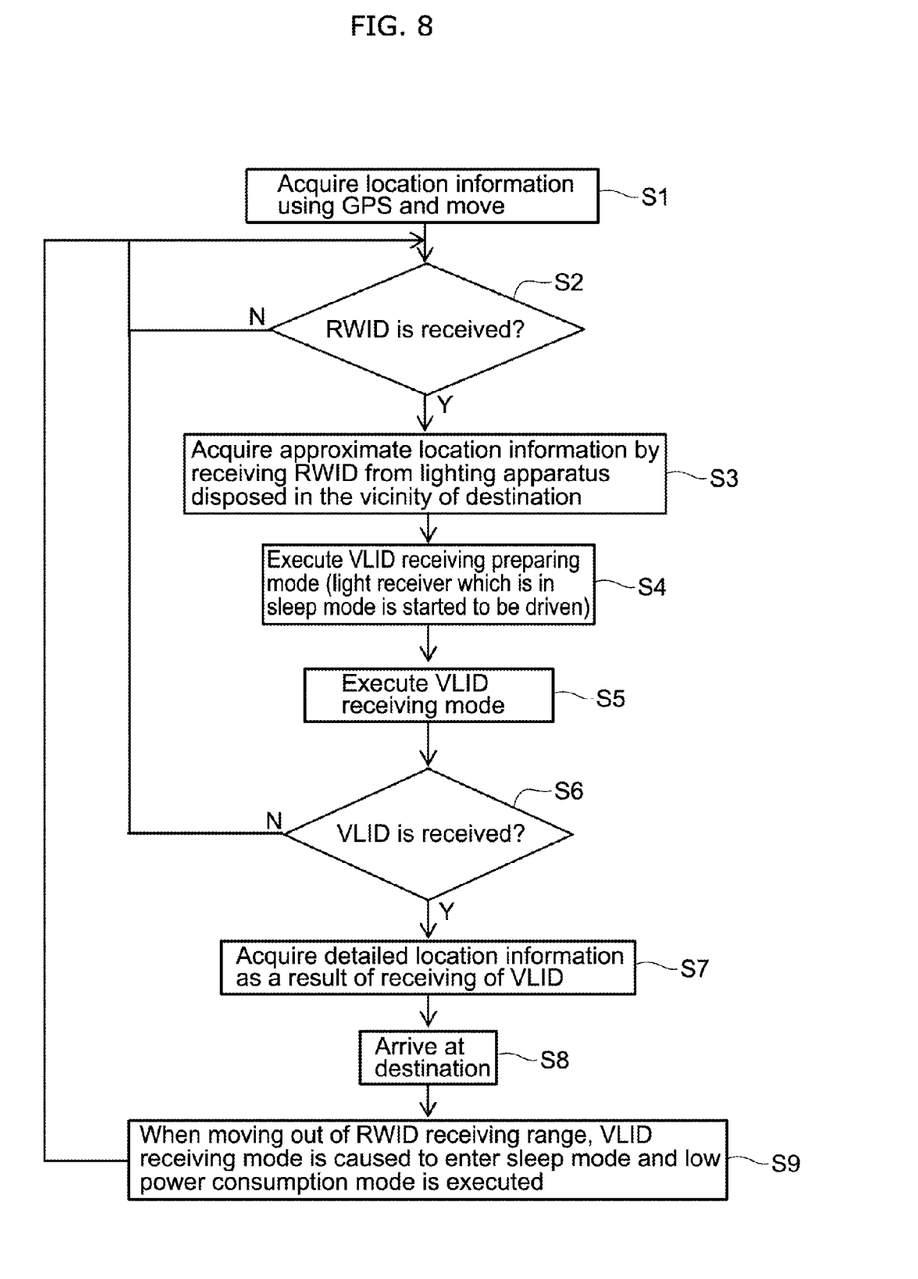
FIG. 8 is a diagram illustrating an operation flow according to the above-described example of an application.

The following describes an example of an application of terminal 8 to the exemplary embodiment, with reference to FIG. 7 and FIG. 8. Terminal 8 according to the application example is autonomous mobile robot 8a such as a serving wagon illustrated in FIG. 7. Autonomous mobile robot 8a includes: radio wave receiver 81 which receives a radio wave signal (RWID) from wireless module 17; light receiver 82 which receives illumination light (VOID) from lighting apparatus 1; and GPS receiver 85 for acquiring location information from a GPS satellite, in the same manner as above-described terminal 8.

An operation example of autonomous mobile robot 8a will be described with reference to a flow illustrated in FIG. 8 in addition to the above-described FIG. 7. First, autonomous mobile robot 8a causes GPS receiver 85 to operate to acquire location information using GPS, and moves (S1). Subsequently, autonomous mobile robot 8a causes radio wave receiver 81 to operate, and upon receiving RWID (52), acquires approximate location information based on RWID from lighting apparatus 1 disposed in the vicinity of a destination (S3). In addition, when a radio wave intensity of received RWID is greater than or equal to a predetermined threshold, light receiver 82 which is in a sleep mode is started to be driven to execute VLID receiving preparing mode (S4) and VLID receiving mode (S5). Then, when light receiver 82 receives VLID (S6), detailed location information is acquired as a result of the receiving of VLID (S7). Subsequently, when autonomous mobile robot 8a arrives at the destination (S8) and moves out of an RWID receiving range, the VLID receiving mode is caused to enter a sleep mode and the low power consumption mode is executed (S9). As described above, it is possible to recognize an accurate location at which autonomous mobile robot 8a is present, from the location information acquired from each of RWID and VLID, and also possible to suppress power consumption.

Figure 9:
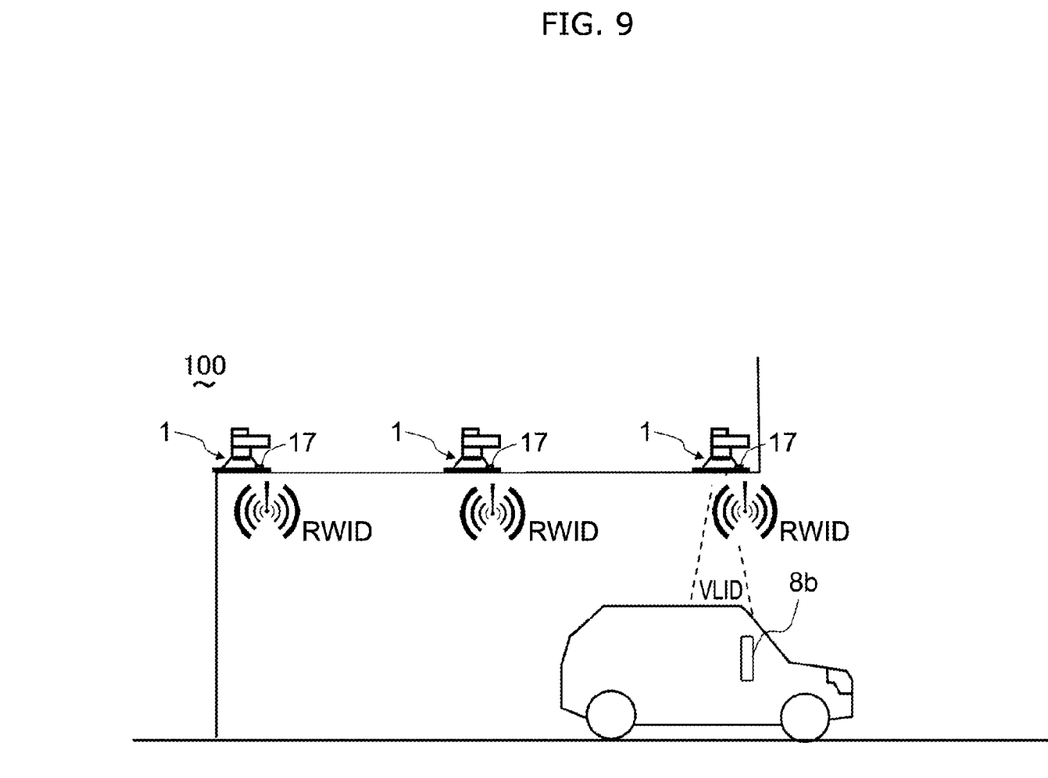
FIG. 9 is a diagram illustrating another example of an application of the above-described visible light communication system.

The following describes another example of an application of lighting apparatus 1 and terminal 8 to the exemplary embodiment, with reference to FIG. 9. In this application example, a plurality of lighting apparatuses 1 are disposed in a parking area or the like, and terminal 8 is car navigation 8b provided to an automobile. Lighting apparatuses 1 each have a unique ID including a respective one of location information items, and RWID and VLID are transmitted from wireless module 17 and lighting apparatuses 1 (light source), respectively. In addition, car navigation 8b calculates a distance from each of lighting apparatuses 1 based on a radio wave intensity of each RWID in addition to VLID from lighting apparatus 1, and acquires own accurate location information. As described above, it is possible to recognize an accurate location at which car navigation 8b is present, using the location information acquired from each of a plurality of RWIDs and VLIDs.

Figure 10:
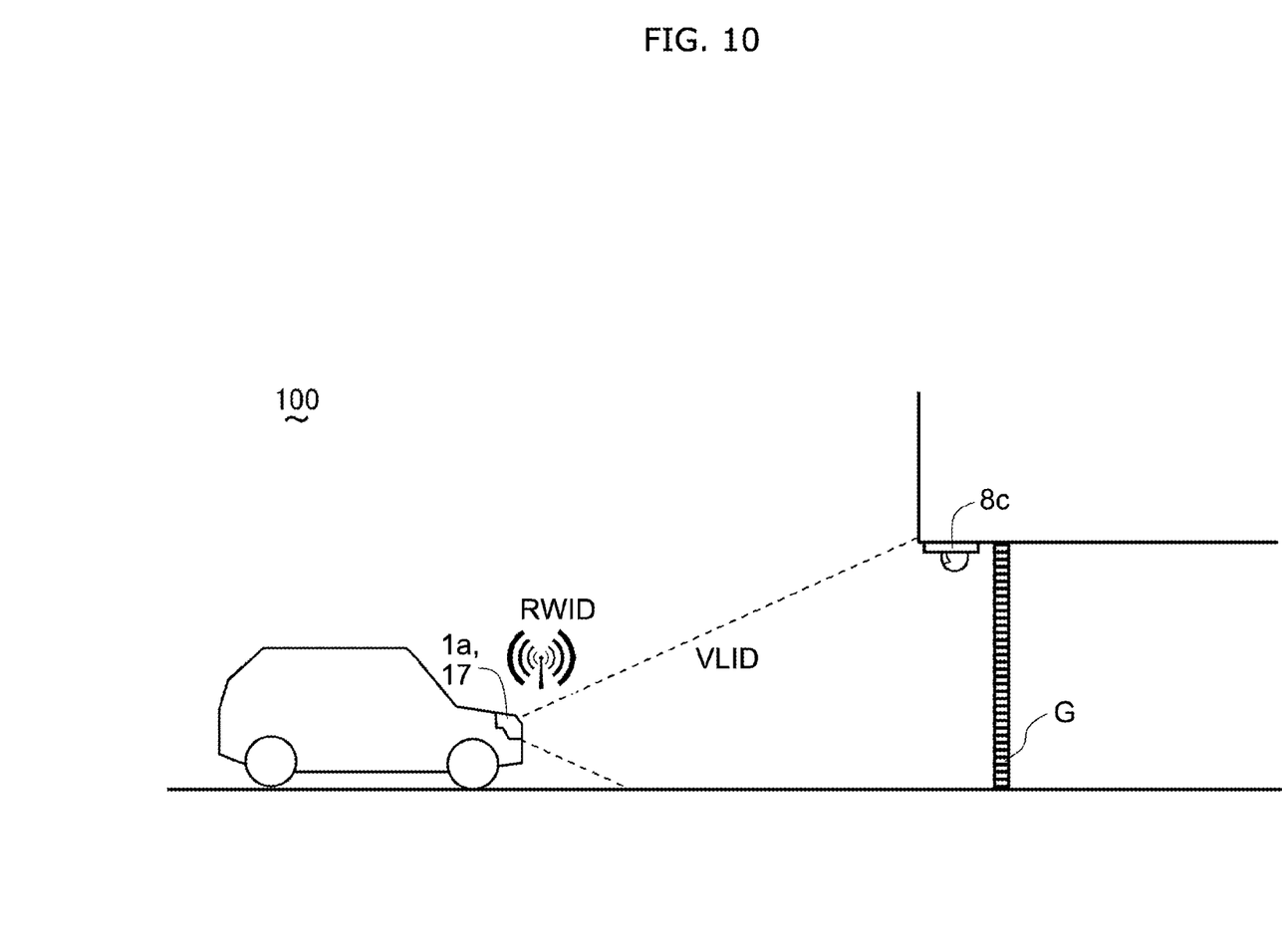
FIG. 10 is a diagram illustrating yet another example of an application of the above-described visible light communication system.

The following further describes another example of an application of lighting apparatus 1 and terminal 8 to the exemplary embodiment, with reference to FIG. 10. Lighting apparatus 1 according to the application example is headlight 1a of an automobile, and terminal 8 is security camera 8c installed in a parking area. In this application example, first, RWID from wireless module 17 included in headlight 1a is transmitted to a range wider than a emitting range of headlight 1a, and a light receiver (not illustrated) of security camera 8c is caused to enter a VLID receiving preparation mode. Subsequently, upon receiving VLID superimposed on light of the headlight, monitoring activity for a surrounding area of the security camera is started. It is to be noted that security camera 8c may output a control signal which opens an electrical door G in the parking area, upon receiving RWID and VLID.

It is to be noted that the visible light communication system according to the present disclosure is not limited to the above-described exemplary embodiment, and various modifications are possible. For example, although the configuration in which wireless module 17 is incorporated in lighting apparatus 1 is shown in the above-described exemplary embodiment, different devices may be used for the configuration, and an apparatus that functions as wireless module 17 and visible light beacon transmitter may be included in an identical device.

As described above, a illumination light communication apparatus according to an aspect of the present disclosure is an illumination light communication apparatus which superimposes a communication signal onto illumination light by modulating a light intensity of the illumination light, the illumination light communication apparatus including: a light source including a solid-state light-emitting element; a power supply circuit which adjusts illumination light of the light source by controlling a load current flowing into the light source; a switching element which modulates an output current supplied from the power supply circuit to the light source; a visible light communication signal circuit which controls ON and OFF of the switching element to output a modulating signal for superimposing a visible light beacon signal including a unique ID onto the illumination light emitted from the light source; a control power supply circuit which supplies power to the visible light communication signal circuit; a wireless module which transmits a radio wave beacon signal including a unique ID; and a radio wave beacon controlling and transmitting circuit which controls the radio wave beacon signal transmitted from the wireless module, wherein the radio wave beacon controlling and transmitting circuit is supplied with power from the control power supply circuit.

The above-described illumination light communication apparatus may further include a storage circuit connected between the visible light communication signal circuit and the radio wave beacon controlling and transmitting circuit 17a, wherein when the light source is off, the wireless module is supplied with driving power from the storage circuit and transmits the radio wave beacon signal.

In the above-described illumination light communication apparatus, the wireless module may shorten an interval for transmitting the radio wave beacon signal more when the light source is off compared to when the light source is on.

In the above-described illumination light communication apparatus, the wireless module may include a receiver which receives a radio wave module signal transmitted from an external terminal.

In addition, a visible light communication system according to an aspect of the present disclosure is a visible light communication system including: the illumination light communication apparatus described above; and a terminal which performs bidirectional communications with the illumination light communication apparatus, wherein the terminal includes: a radio wave receiver which receives the radio wave beacon signal; and a light receiver which receives the visible light beacon signal, the radio wave beacon signal and the visible light beacon signal being transmitted from the illumination light communication apparatus.

In the above-described visible light communication system, the radio wave beacon signal and the visible light beacon signal may each include location information as the unique ID, and the terminal may recognize a location at which the terminal is present, based on the location information acquired from each of the radio wave beacon signal and the visible light beacon signal.

In the above-described visible light communication system, the terminal may execute a low power consumption mode in which the light receiver is OFF when a radio wave intensity of the radio wave beacon signal received by radio wave receiver is smaller than a predetermined threshold, and execute a receiving preparation mode in which the light receiver is driven when the radio wave intensity is greater than or equal to the threshold.

In the above-described visible light communication system, the terminal may include an information outputter which outputs guidance information to a user.

In the above-described visible light communication system, when an illuminance of visible light received by the light receiver is greater than or equal to a predetermined threshold, the terminal may activate the information outputter.

In the above-described visible light communication system, when a radio wave intensity of a radio wave beacon signal received by the radio wave receiver is smaller than a predetermined threshold, the terminal may activate the information outputter.

In the above-described visible light communication system, the terminal may include a global positioning system (GPS) receiver for acquiring location information from a GPS satellite.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An illumination light communication apparatus which superimposes a communication signal onto illumination light by modulating a light intensity of the illumination light, the illumination light communication apparatus comprising:
    a light source including a solid-state light-emitting element;
    a power supply circuit which adjusts illumination light of the light source by controlling a load current flowing into the light source;
    a switch which modulates an output current supplied from the power supply circuit to the light source;
    a visible light communication signal circuit which controls ON and OFF of the switch to output a modulating signal for superimposing a visible light beacon signal including a unique ID onto the illumination light emitted from the light source;
    a control power supply circuit which supplies power to the visible light communication signal circuit;
    a wireless transmitter which transmits a radio wave beacon signal including a unique ID;
    a radio wave beacon controller which controls the radio wave beacon signal transmitted from the wireless transmitter, and
    a power storage connected between the visible light communication signal circuit and the radio wave beacon controller,
    wherein the radio wave beacon controller is supplied with power from the control power supply circuit, and
    wherein when the light source is off, the wireless transmitter is supplied with driving power from the power storage and transmits the radio wave beacon signal.

2. The illumination light communication apparatus according to claim 1,
    wherein the wireless transmitter shortens an interval for transmitting the radio wave beacon signal more when the light source is off compared to when the light source is on.

3. An illumination light communication apparatus which superimposes a communication signal onto illumination light by modulating a light intensity of the illumination light, the illumination light communication apparatus comprising:
    a light source including a solid-state light-emitting element;
    a power supply circuit which adjusts illumination light of the light source by controlling a load current flowing into the light source;
    a switch which modulates an output current supplied from the power supply circuit to the light source;
    a visible light communication signal circuit which controls ON and OFF of the switch to output a modulating signal for superimposing a visible light beacon signal including a unique ID onto the illumination light emitted from the light source;
    a control power supply circuit which supplies power to the visible light communication signal circuit;
    a wireless transmitter which transmits a radio wave beacon signal including a unique ID; and
    a radio wave beacon controller which controls the radio wave beacon signal transmitted from the wireless transmitter,
    wherein the radio wave beacon controller is supplied with power from the control power supply circuit, and
    wherein the wireless transmitter includes a receiver which receives a radio wave module signal transmitted from an external terminal.

4. A visible light communication system, comprising:
    an illumination light communication apparatus which superimposes a communication signal onto illumination light by modulating a light intensity of the illumination light, and
    a terminal which performs bidirectional communications with the illumination light communication apparatus,
    the illumination light communication apparatus comprising:
        a light source including a solid-state light-emitting element;

a power supply circuit which adjusts illumination light of the light source by controlling a load current flowing into the light source;

a switch which modulates an output current supplied from the power supply circuit to the light source;

a visible light communication signal circuit which controls ON and OFF of the switch to output a modulating signal for superimposing a visible light beacon signal including a unique ID onto the illumination light emitted from the light source;

a control power supply circuit which supplies power to the visible light communication signal circuit;

a wireless transmitter which transmits a radio wave beacon signal including a unique ID; and a radio wave beacon controller which controls the radio wave beacon signal transmitted from the wireless transmitter, wherein the radio wave beacon controller is supplied with power from the control power supply circuit, and wherein the terminal includes: a radio wave receiver which receives the radio wave beacon signal; and a light receiver which receives the visible light beacon signal, and wherein the radio wave beacon signal and the visible light beacon signal are transmitted from the illumination light communication apparatus.

5. The visible light communication system according to claim 4, wherein the radio wave beacon signal and the visible light beacon signal each include location information as the unique ID, and the terminal recognizes a location at which the terminal is present, based on the location information acquired from each of the radio wave beacon signal and the visible light beacon signal.

6. The visible light communication system according to claim 4, wherein the terminal executes a low power consumption mode in which the light receiver is OFF when a radio wave intensity of the radio wave beacon signal received by the radio wave receiver is smaller than a predetermined threshold, and executes a receiving preparation mode in which the light receiver is driven when the radio wave intensity is greater than or equal to the threshold.

7. The visible light communication system according to claim 4, wherein the terminal outputs guidance information to a user.

8. The visible light communication system according to claim 7, wherein when an illuminance of visible light received by the light receiver is greater than or equal to a predetermined threshold, the terminal outputs the guidance information to the user.

9. The visible light communication system according to claim 7, wherein when a radio wave intensity of a radio wave beacon signal received by the radio wave receiver is smaller than a predetermined threshold, the terminal outputs the guidance information to the user.

10. The visible light communication system according to claim 4, wherein the terminal includes a global positioning system (GPS) receiver for acquiring location information from a GPS satellite.

* * * * *